United States Patent [19]
Tabb

[11] Patent Number: 6,020,440
[45] Date of Patent: Feb. 1, 2000

[54] PROCESS FOR CURING ELASTOMERIC VINYLIDENE FLUORIDE COPOLYMERS

[75] Inventor: David L. Tabb, Wilmington, Del.

[73] Assignee: Dupont Dow Elastomers, L.L.C., Wilmington, Del.

[21] Appl. No.: 08/939,243

[22] Filed: Sep. 29, 1997

[51] Int. Cl.$^7$ ....................................................... C08F 8/32
[52] U.S. Cl. .................. 525/379; 525/326.3; 525/340; 525/368; 525/369; 525/378; 525/384; 525/387; 525/379
[58] Field of Search ................................. 525/382, 326.3, 525/379, 368, 369, 387, 384, 340, 378

[56] References Cited

U.S. PATENT DOCUMENTS

| | | | |
|---|---|---|---|
| 4,645,799 | 2/1987 | Wachi et al. | 525/199 |
| 4,742,126 | 5/1988 | Moggi et al. | 525/340 |
| 4,758,618 | 7/1988 | Ito et al. | 524/430 |
| 4,882,390 | 11/1989 | Crootaert et al. | 525/326.3 |
| 4,910,260 | 3/1990 | Wachi et al. | 525/260 |
| 4,912,171 | 3/1990 | Grootaert et al. | 525/340 |
| 4,981,912 | 1/1991 | Kurihara | 525/326.3 |
| 5,053,450 | 10/1991 | Coran | 524/506 |
| 5,206,293 | 4/1993 | Sakai et al. | 525/194 |
| 5,430,103 | 7/1995 | Ohata et al. | 525/194 |
| 5,578,681 | 11/1996 | Tabb | 525/194 |

FOREIGN PATENT DOCUMENTS

0589063A1  3/1994  European Pat. Off. .

OTHER PUBLICATIONS

A. L. Logothetis, Chemistry of Fluorocarbon Elastomers, *Prog. Polym. Sci. vol. 14*, 1989, pp. 251–296.

J. R. Cooper, "Elastomers by Radical and Redox Mechanisms", *Polymer Chemistry of Synthetic Elastomers*, Part I, Chapter 4, J. P. Kennedy and Erik G. M. Törnqvist, Ed. Interscience Publishers, Div. Of John Wiley & Sons, New York, London, Sydney; 1968, pp. 273–290.

*Primary Examiner*—Fred Zitomer

[57] ABSTRACT

Elastomeric vinylidene fluoride-containing copolymers are cured by a sequential process. In a first step, gum fluoroelastomer is mixed at a temperature of 150° C.–250° C. in the presence of an organic base and metal oxide or metal hydroxide to generate an unsaturated product. The unsaturated product is mixed with a polyhydroxy compound, polyamine, or organic peroxide and the resultant compounded fluoroelastomer is crosslinked.

16 Claims, No Drawings

6,020,440

PROCESS FOR CURING ELASTOMERIC VINYLIDENE FLUORIDE COPOLYMERS

FIELD OF THE INVENTION

This invention relates to fluoroelastomer curing processes. In particular, this invention relates to an improved process for curing elastomeric vinylidene fluoride copolymers.

BACKGROUND OF THE INVENTION

Elastomeric copolymers of vinylidene fluoride with other fluorinated comonomers, for example hexafluoropropylene, are well known, commercially available compositions which are resistant to chemical and thermal attack. As a result, they find particular utility as the polymeric components of o-ring seals for fuel and lubricant systems and shaft seals in automotive powertrain systems. The stability of these polymers is primarily due to their chemical structure, specifically to the high percentage of carbon-fluorine bonds which they contain. Carbon-fluorine bonds are relatively unreactive compared to bonds between carbon and other elements. Consequently, highly fluorinated vinylidene fluoride copolymers are less susceptible to chemical degradation than are non-fluorinated polymers of comparable structure.

In order to fully develop physical properties such as tensile strength, elongation, and compression set, elastomers must be cured, i.e. crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Commonly used curing agents for fluoroelastomers include difunctional nucleophilic reactants, such as polyhydroxy compounds or diamines. Alternatively, peroxidic curing systems containing organic peroxides and unsaturated coagents, such as polyfunctional isocyanurates, may be employed. Peroxide cure systems are most often utilized to crosslink those fluoroelastomers which contain copolymerized brominated or iodinated cure site monomers or brominated or iodinated end groups derived from chain transfer agents.

The polyhydroxy and peroxide cure systems were developed and optimized for use with copolymers of vinylidene fluoride and hexafluoropropylene ($VF_2$/HFP copolymers). Such copolymers are the most widely used fluoroelastomers commercially. However, products made from other vinylidene fluoride-containing fluoroelastomers are sometimes preferred for use in unusually demanding environments. For example, products made from copolymers of vinylidene fluoride, tetrafluoroethylene, and propylene ($VF_2$/TFE/P terpolymers) are often utilized in applications wherein resistance to low temperature and basic fluids is critical. In many cases the polyhydroxy and peroxide cure processes or curing agent formulations are unsatisfactory when used to crosslink these specialty fluoroelastomers. For example, it is known to cure elastomeric $VF_2$/TFE/P terpolymers with either peroxide or polyhydroxy cure systems as disclosed in U.S. Pat. Nos. 4,882,390; 4,912,171; and 4,910,260. However, when such compositions are cured using a combination of polyhydroxy compound and organoonium compound, as taught in U.S. Pat. No. 4,882,390 and 4,912,171, the cured products exhibit high compression set.

The peroxide cures disclosed in U.S. Pat. No. 4,910,260 are undesirable because the curable compositions which are initially formed are extremely scorchy and would therefore be unsuitable for commercial processes.

Polyhydroxy and peroxide cures of modified $VF_2$/TFE/P terpolymers are also deficient. For example, unsaturated analogues of $VF_2$/TFE/P terpolymers can be prepared in aqueous latex or solution as disclosed in U.S. Pat. Nos. 4,759,618; 4,645,799; and 4,742,126. However, base treatment in latex is cumbersome and uniform dispersion is difficult. Solvent processes are also undesirable on a commercial scale. In addition, polyhydroxy cures of the unsaturated $VF_2$/TFE/P prepared by the latex route require relatively large amounts of crosslinking agent.

Because of the broad utility of elastomeric vinylidene fluoride copolymers, it would be desirable to have available a cure system which would provide a more efficient and effective cure than the polyhydroxy and peroxide processes of the prior art. It would be particularly desirable to have an improved system adaptable to such copolymers which do not contain hexafluoropropylene as well as those which contain this comonomer.

SUMMARY OF THE INVENTION

The present invention provides an improved process for curing vinylidene fluoride copolymers. In particular, the present invention is directed to a process for curing an elastomeric vinylidene fluoride copolymer which comprises the steps of a) mixing i) an elastomeric vinylidene fluoride copolymer gum with ii) a composition comprising an organic base and a metal oxide or hydroxide, said mixing step being conducted at a temperature of 150° C.–250° C., thereby producing an unsaturated elastomeric vinylidene fluoride copolymer;

b) mixing said unsaturated elastomeric vinylidene fluoride copolymer with a composition comprising at least one compound selected from the group consisting of polyhydroxy compounds, polyamines, and organic peroxides to form a compounded unsaturated fluoroelastomer; and c) crosslinking said compounded unsaturated fluoroelastomer.

The invention is further directed to a curable unsaturated fluoroelastomer composition prepared by a process which comprises mixing i) an elastomeric vinylidene fluoride copolymer gum with ii) a composition comprising an organic base and a metal oxide or hydroxide, said mixing step being conducted at a temperature of 150° C.–250° C., thereby producing an unsaturated elastomeric vinylidene fluoride copolymer.

DETAILED DESCRIPTION OF THE INVENTION

The process of the present invention is a sequential cure process for use with fluoroelastomers having copolymerized vinylidene fluoride units. In a first step, the fluoroelastomer is treated with a base at elevated temperatures to generate reactive sites, i.e. carbon-carbon double bonds, along the polymer backbone. The resultant unsaturated polymer is then mixed with a curative selected from the group consisting of polyhydroxy compounds, polyamines, peroxides and mixtures thereof, and crosslinked.

Fluoroelastomers suitable for use in the process are saturated copolymers of vinylidene fluoride with at least one other fluorinated comonomer capable of forming an elastomeric composition. Such comonomers include tetrafluoroethylene, chlorotrifluoroethylene, trifluoroethylene, vinyl fluoride, hexafluoropropylene, perfluoro(alkyl vinyl) ethers, perfluoro(alkoxy vinyl) ethers, perfluoro(alkoxyalkyl vinyl) ethers, ethylene, propylene, isobutylene, bromotrifluoroethylene, 4-bromo-3,3,4,4-tetrafluorobutene-1, bromoperfluoro(ethyl vinyl) ether, and iodotetrafluorobutene. Preferred comonomers include tetrafluoroethylene, propylene, hexafluoropropylene, and perfluoro(methyl vinyl) ether. Preferred copolymers include vinylidene fluoride/tetrafluoroethylene/propylene terpolymers, vinylidene fluoride/tetrafluoroethylene/perfluoro(alkyl vinyl) ether terpolymers, vinylidene fluoride/hexafluoropropylene dipolymers, and vinylidene fluoride/hexafluoropropylene/tetrafluoroethylene terpolymers. The process is particularly useful for curing copolymers containing relatively low levels of copolymerized vinylidene fluoride units, i.e. those fluoroelastomers having less than 50 wt. % copolymerized vinylidene fluoride units, typically 2–45 wt. % copolymerized vinylidene fluoride units. Brominated or iodinated fluoroelastomers which are suitable for use in the invention may contain copolymerized brominated or iodinated comonomer units which have been introduced by copolymerization of brominated or iodinated monomers, for example 4-bromo-3,3,4,4-tetratetrafluorobutene-1 or bromoperfluoro(ethyl vinyl) ether. Alternatively, these halogens may be introduced by use of iodinated or brominated chain transfer agents such as methylene iodide or 1,4-diiodoperfluorobutane. The presence of brominated or iodinated groups permits facile peroxide cures.

In order to exhibit elastomeric properties, vinylidene fluoride copolymers must contain levels of copolymerized fluorinated comonomer units sufficient to prevent crystallization of the polymer and to produce an amorphous morphology. The comonomer percentages which define amorphous, elastomeric compositions, as opposed to thermoplastic, crystalline compositions, will differ depending on the particular comonomers which are present in the polymer chain. For example, in the case of $VF_2$/HFP dipolymers and vinylidene fluoride/hexafluoropropylene/tetrafluoroethylene terpolymers ($VF_2$/HFP/TFE terpolymers), the elastomeric region encompasses compositions having 20–70 wt. % $VF_2$, 20–60 wt. % HFP, and 0–40% TFE. In contrast, the elastomeric region for $VF_2$/TFE/P copolymers encompasses compositions containing 2–90 mol % $VF_2$, 5–65 mol % TFE, and 5–50 mol % P.

Elastomeric vinylidene fluoride copolymers are generally prepared by free radical emulsion or suspension polymerization. The polymerizations may be carried out under steady-state conditions. Alternatively, batch, and semi-batch processes may be employed. The resulting emulsions are usually coagulated by addition of electrolytes. The precipitated polymer is washed with water and then dried, for example in an air oven, to produce a substantially dry fluoroelastomer gum.

According to the process of the invention, an unsaturated elastomeric vinylidene fluoride copolymer gum is mixed in bulk with an organic base, thereby generating double bonds in the polymer backbone by dehydrofluorination. By elastomeric vinylidene fluoride copolymer gum is meant coagulated fluoroelastomer having a water content of less than 5 wt. %. Preferably, gum elastomers have a water content of less than 1 wt. %. Mixing may be effected in an internal mixer, for example a Banbury mixer, on a rubber mill, in an extruder, or in any processing equipment capable of homogeneously incorporating additives into solid elastomer compositions. Preferably, an internal mixer is utilized and mixing takes place within 1–30 minutes, preferably within 2–15 minutes. The mixing operation is most effectively carried out at elevated temperatures, usually between 150° C.–250° C., preferably between 170° C.–230° C., and most preferably between 180° C.–220° C.

Organic bases which promote the dehydrofluorination reaction and resultant generation of double bonds include quaternary ammonium salts, quaternary phosphonium salts, cyclic amines, and monofunctional amines. Most preferred are quaternary ammonium salts, such as tetrabutylammonium bromide, tetrabutylammonium chloride, benzyltributylammonium chloride, benzyltriethylammonium chloride, tetrabutylammonium hydrogen sulfate and tetrabutylammonium hydroxide. Also preferred are quaternary phosphonium salts, such as benzyltriphenylphosphonium chloride, tributylallylphosphonium chloride, tributyl-2-methoxypropylphosphonium chloride, and benzyldiphenyl (dimethyl-amino)phosphonium chloride. Other suitable bases include monofunctional amines, such as benzylmethylamine and benzylethanolamine as well as cyclic amines, including 1,8-diazabicyclo[5.4.0]undec-7-ene. Quaternary ammonium salts are preferred because they exhibit enhanced activity in this system. The amount of base used is between 0.1 and 10 parts by weight per hundred parts fluoroelastomer. Preferably, 0.5–3.0 parts base per hundred parts fluoroelastomer is used.

The dehydrofluorination step is carried out in the presence of a metal oxide or metal hydroxide in addition to base. The metal oxide or metal hydroxide acts as an acid acceptor for hydrogen fluoride generated during the dehydrofluorination reaction. Metal oxides or hydroxides which are useful acid acceptors include calcium hydroxide, magnesium oxide, lead oxide, and calcium oxide. Calcium hydroxide and magnesium oxide are preferred.

Optionally, additives generally used in rubber processing may be present during the dehydrofluorination step. Such additives include process aids, carbon black, mineral fillers, and coagents, for example triallylisocyanurate, with the proviso that no peroxide is present.

It is an important feature of the present invention that the curing reaction be performed sequentially. Therefore, the dehydrofluorination step is conducted substantially in the absence of the full curative system to minimize premature crosslinking. Combinations of ingredients which would cause crosslinking of the dehydrofluorinated polymer should be substantially absent in the first step of the process. Specifically, the presence of a combination of polyhydroxy compound and base will cause premature crosslinking; the presence of a polyamine will cause premature crosslinking; and the presence of the combination of peroxide and coagent will cause premature crosslinking. Preferably, no more than 0.5 parts per hundred parts fluoroelastomer of a full curative system is present in the mixture of copolymer, base, and metal oxide or hydroxide. It has been found that if the dehydrofluorination step is conducted in the presence of crosslinking agents, i.e. as a one-step non-sequential cure, scorchy compositions are produced. The term scorchiness is used in the art to indicate that premature vulcanization occurs when a particular elastomer is mixed with a crosslinking agent. In general, scorchiness is a particular problem encountered when $VF_2$/HFP dipolymers, $VF_2$/HFP/TFE terpolymers, or $VF_2$/TFE/P terpolymers are cured under non-sequential conditions. Scorchiness cannot be tolerated in commercial curing processes used to produce molded goods. By conducting the curing process sequentially, scorchiness is eliminated or substantially reduced. Thus, according to the present invention, the initial dehydrofluorination reaction is preferably conducted in the absence of polyhydroxy compounds, polyamines, blends of peroxides and unsaturated coagents, and mixtures thereof.

Typical polyhydroxy compounds which act as crosslinking agents and which preferably are not present during the dehydrofluorination step include bisphenols, such as 4,4'-hexafluoroisopropylidene diphenol (i.e. bisphenol AF), and polyhydroxyphenols such as hydroquinone. Polyhydroxy compounds which are active crosslinking agents are more fully described below in connection with the crosslinking step of the process of the invention.

Multifunctional amines and amine derivatives are capable of acting as crosslinking agents and their presence should also be avoided in the dehydrofluorination step. Such amines include organic aliphatic or aromatic diamines such as ethylenediamine or hexamethylenediamine, or their carbamates, hydrochlorides, oxalates, or reaction products with hydroquinone.

Likewise, the presence of a combination of organic peroxides and polyunsaturated compounds should be avoided during the dehydrofluorination step. Such combinations act as curing agents. Examples of organic peroxides which are particularly effective curing agents for fluoroelastomers include dialkyl peroxides which decompose at a temperature above 50° C. Polyunsaturated compounds which cooperate with such peroxides to provide curing systems include methacrylates, allyl compounds, divinyl compounds, and polybutadienes.

The dehydrofluorinated elastomeric vinylidene fluoride copolymers which are produced in the first step of the process of the present invention are stable polymeric compositions. They can be recovered and stored at temperatures under conditions used with conventional gum fluoroelastomers without deterioration of physical properties. The level of unsaturation generated during the dehydrofluorination step of the process can be determined by Fourier transform infrared spectroscopy using bands located at or near 3130, 1722, and 1690 cm$^{-1}$.

According to the process of the present invention, once a dehydrofluorinated fluoroelastomer has been prepared, it is then mixed with a curing agent in a second step. The mixing process takes place below the curing temperature of the fluoroelastomer, generally below 120° C. The mixing step is accomplished in equipment similar to that used for the first step of the present process, preferably in an internal mixer or on a two-roll rubber mill. The second mixing step may take place immediately following the dehydrofluorination step, merely by adding curing agents and other optional additives to the mixing equipment. Alternatively, and preferably, the dehydrofluorinated polymer is prepared in a first step, the polymer is isolated, and addition of curing agents and other additives takes place in a discrete second step.

Curing agents which may be utilized in the second step of the present process include those curing agents commonly utilized to vulcanize fluoroelastomers. The most widely used curing system for elastomeric vinylidene fluoride copolymers is a mixture of a polyhydroxy compound, a vulcanization accelerator, and a metal oxide or metal hydroxide. The polyhydroxy compound is the crosslinking agent, while the vulcanization accelerator facilitates formation of the reactive intermediate species. The metal compound absorbs gaseous and acidic materials which are evolved during vulcanization and provides long term aging stability. In general, the curable composition will contain 1–15 parts by weight per 100 parts elastomer of metal oxide or metal hydroxide; 0.1–5 parts per 100 parts elastomer of polyhydroxy compound; and 0.1–5.0 parts per 100 parts elastomer of the vulcanization accelerator.

It is preferred to use 3–10 parts of metal oxide or metal hydroxide per 100 parts elastomer. Useful metal oxides or hydroxides include magnesium oxide, zinc oxide, calcium oxide, lead oxide, and calcium hydroxide. Because metal oxide or hydroxide is added during the first step of the present process, addition of metal compound is generally not necessary during the second mixing step.

The preferred amount of polyhydroxy crosslinking agent is 1–3 parts polyhydroxy compound per 100 parts elastomer. Typical polyhydroxy crosslinking agents include di-, tri-, and tetrahydroxybenzenes, naphthalenes, and anthracenes, and bisphenols of the formula

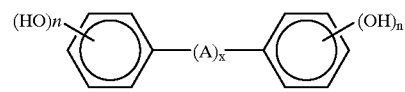

where A is a difunctional aliphatic, cycloaliphatic, or aromatic radical of 1–13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Phenolate salts are also active crosslinking agents, such as the dipotassium salt of bisphenol AF. Preferred polyhydroxy compounds include hexafluoroisopropylidene-bis(4-hydroxy-benzene) (i.e. bisphenol AF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methyl-phenylene, dimethylphenylene, 1,4-naphthylene, 3-fluoro-1,4-naphthylene, and 2,6-naphthylene. Polyhydroxyphenols of the formula

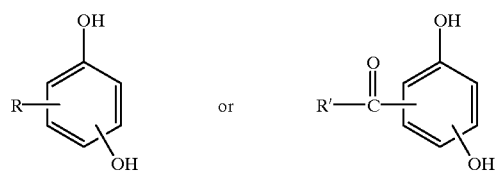

where R is H or an alkyl group having 1–4 carbon atoms or an aryl group containing 6–10 carbon atoms and R' is an alkyl group containing 1–4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 9,10-dihydroxyanthracene.

When peroxide curative systems are utilized, it is not necessary to add an accelerator during the second step of the process of the invention. However, if a polyhydroxy cure system is to be used, it is preferable to add an accelerator, usually a quaternary ammonium salt or quaternary phosphonium salt, during the second step. Thus, it is preferred to add 1–3 parts quaternary ammonium or phosphonium salt accelerator per 100 parts dehydrofluorinated elastomer during the second mixing step of the present process when effecting a polyhydroxy cure. Vulcanization accelerators include quaternary ammonium, phosphonium, arsonium, and stibonium salts of the formula

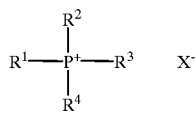

where P is phosphorous, nitrogen, arsenic, or antimony; $R^1$, $R^2$, $R^3$, and $R^4$ are individually $C_1$–$C_{20}$ alkyl, aryl, aralkyl, alkenyl, and the chlorine, fluorine, bromine, cyano, —OR, and —COOR substituted analogs thereof, with R being $C_1$–$C_{20}$ alkyl, aryl, aralkyl, alkenyl, and where X is halide, sulfate, sulfite, carbonate, pentachlorothiophenolate, tetrafluoroborate, hexafluorosilicate, hexafluorophosphate, dimethyl phosphate, and $C_1$–$C_{20}$ alkyl, aryl, aralkyl, and alkenyl carboxylates and dicarboxylates. Particularly preferred are benzyltriphenylphosphonium chloride, benzyltriphenylphosphonium bromide, tetrabutylammonium hydrogen sulfate, tributylallylphosphonium chloride, tributyl-2-methoxypropylphosphonium chloride, 1,8-diazabicyclo[5.4.0]undec-7-ene, and benzyldiphenyl (dimethylamino) phosphonium chloride. Other useful accelerators are methyltrioctylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenylphosphonium chloride, tetrabutylphosphonium bromide, m-trifluoromethyl-benzyltrioctylphosphonium chloride, and other quaternary compounds disclosed in U.S. Pat. No. 3,876,654.

Amine-based curing systems may also be used in the process of the invention. Polyamines capable of acting as crosslinking agents include polyamines such as diethylenetriamine, diamylenetriamine, triethylenetetramine, tripropylenetetramine, diethylenepentamine, dihexylenetriamine, trihexylenetetramine, or mixtures thereof. Other useful polyamines include compounds of the general formula

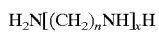

where n is a positive whole number from 2 through 12; and x is a positive whole number from 1 through 20. Examples include ethylenediamine, propylenediamine, and butylenediamine. In addition, amine derivatives may be used as curing agents, for example, carbamates, hydrochlorides, oxalates, or reaction products with hydroquinone. Among these are hexamethylenediamine carbamate, ethylenediamine carbamate, N,N'-dicinnamylidene-1,6-hexanediamine, and alicyclic amine salts. Typical amine cure formulations require the use of 1–5 parts of the amine or amine derivative per 100 parts polymer.

Peroxide curing systems represent a third type of fluoroelastomer curative. Suitable peroxides are those which generate free radicals at curing temperatures. Dialkyl peroxides which decompose above 50° C. are especially preferred. In many cases one will prefer to use a di-t-butylperoxide having a tertiary carbon atom attached to a peroxy oxygen. Among the most useful are 2,5-dimethyl-, 2,5-di(t-butylperoxy)hexyne-3 and 2,5-dimethyl-2,5-di(t-butyl-peroxy)hexane. Other peroxides can be selected from such compounds as dicumyl peroxide, dibenzoyl peroxide, t-butyl perbenzoate, and di[1,3-dimethyl-3-(t-butyl-peroxy)butyl]carbonate. The peroxide component of the cure system is generally used in an amount of 0.2–5.0 parts per 100 parts fluoroelastomer, preferably in amounts of 0.5–3.0 parts per 100 parts fluoroelastomer. Another material usually blended with the composition is a coagent composed of a polyunsaturated compound which is capable of cooperating with the peroxide to provide a useful cure. Suitable coagents include one or more of the following compounds: triallyl cyanurate; triallyl isocyanurate; tris(diallylamine-s-triazine); triallyl phosphite; hexaallyl phosphoramide, N,N-diallyl acrylamide; N,N,N'N'-tetraallyl terephthalamide; N,N,N',N'-tetraallyl malonamide; trivinyl isocyanurate; 2,4,6-trivinylmethyltrisiloxane; and tri(5-norbornene-2-methylene)cyanurate. The coagents are generally added in amounts of about 0.5–10 percent by weight of the copolymer, preferably 1–5 percent by weight. Optionally, the coagent may be present in the dehydrofluorination step, with the proviso that no peroxide is also present.

More than one class of curing agent may be added to the dehydrofluorinated fluoroelastomer in the second step of the process. For example, a typical dual cure system of this type could include organic peroxide; coagent, e.g. triallylisocyanurate; quaternary ammonium salt, e.g. tetrabutylammonium hydrogen sulfate; and bisphenol AF.

Curing agents are added to the fluoroelastomer at temperatures below that at which significant amounts of crosslinks are formed, usually at temperatures of 80° C.–120° C. In addition, other additives, commonly used in elastomer compounding and processing, may be added during the second step of the process. Addition may take place before addition of the curative, simultaneously with it, or following the addition. Typical additives include fillers, plasticizers, processing aids, antioxidants, pigments, and the like. The amount of such ingredients which is added will depend on the particular uses for which the cured compositions are adapted. Fillers, such as carbon black, clays, barium sulfate, calcium carbonate, magnesium silicate, and fluoropolymers are generally added in amounts of from 5–100 parts by weight per 100 parts fluoroelastomer. The amount of plasticizer used is generally from 0.5–5.0 parts by weight per 100 parts fluoroelastomer. Typical plasticizers include esters, such as dioctyl phthalate and dibutyl sebacate. Processing aids are generally used in amounts of from 0.1–2.0 parts by weight per 100 parts fluoroelastomer. Suitable processing aids include octadecylamine, tetramethylene sulfone, p-chlorophenyl sulfone, and waxes, for example, carnauba wax, that aid in the processing of the compositions.

The final step of the process of the invention is the crosslinking step. Crosslinking is accomplished by subjecting the compounded fluoroelastomer composition to conditions which result in formation of interchain linkages. Generally, crosslinking is carried out by heating the composition for about 1–60 minutes at about 150°–200° C. Conventional rubber curing presses, molds, extruders, and the like provided with suitable heating and curing means can be used. Also, for maximum heat resistance and dimensional stability, it is preferred to carry out a post curing operation wherein the molded or extruded article is heated in an oven or the like for an additional period of about 1–48 hours, typically from about 180°–300° C. In addition, the crosslinking step may be accomplished by exposure to radiation, generally in the range of 2–40 megarads, preferably in the range of 5–15 megarads. The exposure can be a single dose or multiple exposures. Multiple exposures can minimize heat buildup in the fluoroelastomer being treated. This is desirable because it leads to reduced possibility of degradation.

The process of the present invention is useful in curing elastomeric vinylidene fluoride copolymers of all types. It is of particular benefit in curing $VF_2$/TFE/P terpolymers and elastomeric vinylidene fluoride copolymers having 2–45 wt. % copolymerized $VF_2$ units. Use of the process enables these compositions, which have unusually good base resistance and low temperature properties, to be cured more efficiently and effectively on a commercial scale to produce shaft seals and o-rings for sealing applications.

The invention is now illustrated by the following embodiments in which all parts are by weight unless otherwise indicated.

EXAMPLES

Test Methods

Physical properties of the compositions described in the examples were measured according to the following test procedures.

| | |
|---|---|
| Mooney Scorch | ASTM D1646 |
| Oscillating Disc Rheometer (ODR) | ASTM D2084 |
| Tensile Strength | ASTM D412 |
| Modulus | ASTM D412 |
| Elongation at Break | ASTM D412 |
| Hardness | ASTM D2240 |
| Compression Set-B | ASTM D395 |

Example 1 and Comparative Example A

A B Banbury mixer was charged with 95.5 parts of Fluoroelastomer A (a $VF_2$TFE/P terpolymer having a $VF_2$ content of approximately 2–10 wt. % and a fluorine content of 57 wt. %; nominal Mooney viscosity $ML_{1+10}$ @ 100° C. of 85; density 1.52 g/cc), 3.0 parts Maglite D magnesium oxide, 6.0 parts calcium hydroxide, and 4.5 parts of Fluoroelastomer Curative A (a 33 wt. % dispersion of tetrabutylammonium hydrogen sulfate in Fluoroelastomer A). The load factor was 70%. The ingredients were mixed at a rotor speed of 55 rpm until a homogeneous blend was produced. Mixing was continued at a rotor speed of 95 rpm until a chart temperature of 177° C. was attained. Mixing continued for 10 minutes and the rotor speed was adjusted so that a chart temperature of 177°–204° C. was maintained. The dehydrofluorinated fluoroelastomer composition which was formed as a result of this treatment was discharged and sheeted out on a two roll rubber mill. A curable composition was prepared by mixing the following ingredients on a two roll rubber mill: 109 parts of the dehydro-fluorinated fluoroelastomer composition; 2.5 parts of Vulcup® 40KE peroxide [40% α, α'-bis-(t-butylperoxy)diisopropylbenzene on inert filler]; 2.0 parts triallylisocyanurate; and 25 parts MT (N-990) carbon black. Mixing was carried out at a temperature of approximately 90° C. The curable composition was molded into 76×152×1.9 mm slabs. Compression set test specimens in pellet form were prepared from molded plies (ply diameter 12.7 mm; thickness 1.905 mm). The pellets and molded slabs were press cured at 177° C. for 10 minutes and then post cured at 200° C. for 16 hours. Mooney scorch and cure response of the curable composition are shown in Table I. Physical properties of the cured composition are also shown in Table I. In addition, a metal adhesion test specimen was prepared by dipping a grit-blasted carbon steel strip (25.4 mm×102 mm) in a 50/50 volume to volume mixture of Chemlok 5150/methanol. The coated strip was air dried and then baked at 120° C. for 30 minutes. A cured, molded three-layer laminate construction was prepared by sandwiching the curable fluoroelastomer composition between the coated steel strip and canvas and then molding the laminate at 177° C. for 10 minutes. Adhesion was determined by measuring the percentage of stock tear after the fluoroelastomer composition was pulled from the coated metal strip. Results are shown in Table I.

For comparison, a polymer composition was prepared using a one-step cure process rather than the sequential cure process described above for the Example 1 composition. That is, a curable composition was prepared by mixing the ingredients used in the Example 1 composition, in the same proportions as described above, on a two-roll rubber mill at approximately 90° C. There was no preliminary dehydrofluorination step in a Banbury mixer. All curatives and other ingredients were added to the fluoroelastomer during the mixing step on the two-roll rubber mill. Molded slabs, pellet test specimens and adhesion test specimens were then prepared and cured as described for the Example 1 composition which had been prepared using the sequential process. Cure response and physical property test results are shown in Table I.

TABLE I

| | Example 1 | Comparative Example A |
|---|---|---|
| Mooney Scorch @ 121° C. | | |
| Minimum Viscosity (units) | 54 | 39 |
| Time to 2 Point Rise (minutes) | >30 | 3 |
| Time to 5 Point Rise (minutes) | >30 | 4 |
| Time to 10 Point Rise (minutes) | >30 | 5 |
| ODR (177° C., 3° arc, 12 minutes) | | |
| ML (N · m) | 2.0 | 1.1 |
| ts2 (minutes) | 1.7 | 1.5 |
| t'50 (minutes) | 3.2 | 4.1 |
| t'90 (minutes) | 8.1 | 9.0 |
| MH (N · m) | 4.8 | 6.5 |
| Vulcanizate Properties (Press Cure 177° C./10 minutes; Post Cure 200° C./16 hours) | | |
| Tensile Strength (MPa) | 11.0 | 13.4 |
| 100% Modulus (MPa) | 3.8 | 4.4 |
| Elongation at Break (%) | 290 | 305 |
| Hardness (Durometer A) | 71 | 71 |
| Compression Set (%) (150° C./70 hours, plied pellets) | 39 | 29 |
| Metal Adhesion | 80% stock tear | 0% stock tear |

The data show that the sequential curing process of Example 1 provides a composition with improved scorch safety, as evidenced by longer scorch times of the Example 1 composition compared to scorch times of the Comparative Example A composition in the Mooney scorch test. The significant reduction in scorch occurs with an unusual reduction in cure time, as indicated by the t'50 and t'90 values in the ODR test. In addition, the data indicate that the Example 1 sequentially cured composition provides significantly better metal adhesion compared to the single-step cured product, as evidenced by a result of 80% stock tear compared to 0% stock tear for the single-step cured control.

Example 2 and Control B

A B Banbury mixer was charged with 97 parts of Fluoroelastomer B (a $VF_2$TFE/P terpolymer having a monomer weight ratio of 33/52/15; a nominal Mooney viscosity $ML_{1+10}$ @ 121° C. of 60; and a density of 1.60 g/cc), 3.0 parts Maglite D magnesium oxide, 6.0 parts calcium hydroxide, and 3.0 parts of Fluoroelastomer Curative B (a 33 wt. % dispersion of tetrabutylammonium hydrogen sulfate in Fluoroelastomer B). The load factor was 70%. The polymer was mixed using the same procedure and times as in Example 1 and the resultant dehydrofluorinated fluoroelastomer composition was discharged and sheeted out on a two roll rubber mill. A curable composition was prepared by mixing the following ingredients on a two roll rubber mill: 109 parts of the dehydrofluorinated fluoroelastomer composition; 2.5 parts of Vulcupo® 40KE peroxide [40% α, α'-bis-(t-butylperoxy)diisopropylbenzene on inert filler)]; 2.0 parts triallylisocyanurate; and 25 parts MT (N-990) carbon black. Mixing was carried out at a temperature of approximately 90° C. The curable composition was molded into slabs and cured as described in Example 1. Compression set test specimens were prepared and cured in the same manner as described above in Example 1. Physical properties of the uncured and cured composition are shown in Table II.

For comparison, a polymer composition was prepared using a one-step cure rather than a sequential cure. That is, a curable composition was prepared by mixing the ingredients used in the Example 2 composition, in the same proportions as described above, on a two-roll rubber mill at approximately 90° C. There was no preliminary dehydrofluorination step in a Banbury mixer. All curatives and other ingredients were added to the fluoroelastomer during the mixing step on the two-roll rubber mill. Molded slabs, pellet test specimens and adhesion test specimens were then prepared and cured as described for the Example 2 composition. Cure response and physical property test results are shown in Table II.

Example 3 and Comparative Example C

One hundred parts of Fluoroelastomer C (a $VF_2$/HFP dipolymer having a monomer weight ratio of 60/40; and a nominal Mooney viscosity $ML_{1+10}$ @ 121° C. of 50), 10.0 parts calcium hydroxide, and 3.0 parts of Fluoroelastomer Curative C (a 33 wt. % dispersion of benzyltriphenylphosphonium chloride in a copolymer of $VF_2$/HFP having a 40/60 wt. ratio) were charged into a B Banbury mixer. The load factor was 70%. The polymer was mixed using the same procedure and mixing times as in Example 1 and the resultant dehydrofluorinated fluoroelastomer composition was discharged and sheeted out on a two roll rubber mill. A curable composition was prepared by mixing the following ingredients on a two roll rubber mill: 113 parts of the dehydrofluorinated fluoroelastomer composition; 2.5 parts of Luperco® 101XL peroxide [45 wt. % 2,5-dimethyl-2,5-di-(t-butylperoxy)hexane on inert filler)]; 3.0 parts triallylisocyanurate; and 25 parts MT (N-990) carbon black. Mixing was carried out at a temperature of approximately 90° C. The curable composition was molded into slabs and cured as described in Example 1. Compression set test specimens were prepared and cured in the same manner as described above in Example 1. Physical properties of the uncured and cured composition are shown in Table III.

For comparison, a polymer composition was prepared using a one-step cure rather than a sequential cure. That is, a curable composition was prepared by mixing the ingredients used in the Example 3 composition, in the same proportions as described above, on a two-roll rubber mill at approximately 90° C. There was no preliminary dehydrofluorination step in a Banbury mixer. All curatives and other ingredients were added to the fluoroelastomer during the mixing step on the two-roll rubber mill. Molded slabs, pellet test specimens and adhesion test specimens were then prepared and cured as described for the Example 1 composition. Cure response and physical property test results are shown in Table III.

TABLE II

|  | Example 2 | Comparative Example B |
|---|---|---|
| Mooney Scorch @ 121° C. | | |
| Minimum Viscosity (units) | 47 | 51 |
| Time to 2 Point Rise (minutes) | >30 | >30 |
| Time to 5 Point Rise (minutes) | >30 | >30 |
| Time to 10 Point Rise (minutes) | >30 | >30 |
| ODR (177° C., 3° arc, 12 minutes) | | |
| ML (N · m) | 2.0 | 1.9 |
| ts2 (minutes) | 1.4 | 1.4 |
| t'50 (minutes) | 3.1 | 3.3 |
| t'90 (minutes) | 7.6 | 8.5 |
| MH (N · m) | 7.0 | 6.0 |
| Vulcanizate Properties (Press Cure 177° C./10 minutes; Post Cure 200° C./16 hours) | | |
| Tensile Strength (MPa) | 14.5 | 11.8 |
| 100% Modulus (MPa) | 4.0 | 3.9 |
| Elongation at Break (%) | 295 | 230 |
| Hardness (Durometer A) | 68 | 70 |
| Compression Set (%) (150° C./70 hours, plied pellets) | 24 | 32 |

TABLE III

|  | Example 3 | Comparative Example C |
|---|---|---|
| Mooney Scorch @ 121° C. | | |
| Minimum Viscosity (units) | 49 | 45 |
| Time to 2 Point Rise (minutes) | 24 | 4 |
| Time to 5 Point Rise (minutes) | >30 | 5 |
| Time to 10 Point Rise (minutes) | >30 | 6 |
| ODR (177° C., 3° arc, 12 minutes) | | |
| ML (N · m) | 1.8 | 1.5 |
| ts2 (minutes) | 1.5 | 1.1 |
| t'50 (minutes) | 2.2 | 2.0 |
| t'90 (minutes) | 3.3 | 3.4 |
| MH (N · m) | 3.8 | 4.0 |
| Vulcanizate Properties (Press Cure 177° C./10 minutes; Post Cure 200° C./16 hours) | | |
| Tensile Strength (MPa) | 9.9 | 12.4 |
| 100% Modulus (MPa) | 3.2 | 3.9 |
| Elongation at Break (%) | 330 | 305 |
| Hardness (Durometer A) | 70 | 72 |
| Compression Set (%) (150° C./70 hours, plied pellets) | 26 | 27 |

The data show that the sequential curing process utilized in the cure of the Example 2 compositions provides a composition having reduced cure time compared to the standard cure of Comparative Example B, as indicated by the values of t'50 and t'90 in the ODR test.

The data indicate that the composition prepared using the sequential curing process of Example 3 exhibited improved scorch safety compared to the Comparative Example C composition which was cured using the conventional one-step technique. This is evidenced by longer scorch times for the Example 3 composition. The significant reduction in scorchiness occurs without a reduction in cure time, as shown by the values of t'50 and t'90 in the ODR test.

Example 4 and Comparative Example D

One hundred parts of Fluoroelastomer D (a $VF_2/HFP/TFE$ terpolymer having a monomer weight ratio of 45/30/25 and a nominal Mooney viscosity $ML_{1+10}$ @ 121° C. of 65), 10.0 parts calcium hydroxide, and 3.0 parts of Fluoroelastomer Curative C (a 33 wt. % dispersion of benzyltriphenyl-phosphonium chloride in a copolymer of $VF_2/HFP$ having a 60/40 wt. ratio) were charged into a B Banbury mixer. The load factor was 70%. The polymer was mixed using the same procedure and mixing times as in Example 1 and the resultant dehydrofluorinated fluoroelastomer composition was discharged and sheeted out on a two roll rubber mill. A curable composition was prepared by mixing the following ingredients on a two roll rubber mill: 113 parts of the dehydrofluorinated fluoroelastomer composition; 2.5 parts of Luperco 101XL peroxide [45 wt. % 2,5-dimethyl-2,5-di-(t-butylperoxy)hexane on inert filler)]; 3.0 parts triallyliso-cyanurate; and 25 parts MT (N-990) carbon black. Mixing was carried out at a temperature of approximately 90° C. The curable composition was molded into slabs and cured as described in Example 1. Compression set test specimens were prepared and cured in the same manner as described above in Example 1. Physical properties of the uncured and cured composition are shown in Table IV.

For comparison, a polymer composition was prepared using a one-step cure rather than a sequential cure. That is, a curable composition was prepared by mixing the ingredients used in the Example 4 composition, in the same proportions as described above, on a two-roll rubber mill at approximately 90° C. There was no preliminary dehydrofluorination step in a Banbury mixer. All curatives and other ingredients were added to the fluoroelastomer during the mixing step on the two-roll rubber mill. Molded slabs, pellet test specimens and adhesion test specimens were then prepared and cured as described for the Example 4 composition. Cure response and physical property test results are shown in Table IV.

TABLE IV

|  | Example 4 | Comparative Example D |
|---|---|---|
| Mooney Scorch @ 121° C. | | |
| Minimum Viscosity (units) | 46 | 45 |
| Time to 2 Point Rise (minutes) | 27 | 7 |
| Time to 5 Point Rise (minutes) | >30 | 9 |
| Time to 10 Point Rise (minutes) | >30 | 18 |
| ODR (177° C., 3° arc, 12 minutes) | | |
| ML (N · m) | 1.8 | 1.4 |
| ts2 (minutes) | 1.4 | 1.4 |
| t'50 (minutes) | 2.0 | 2.0 |
| t'90 (minutes) | 3.0 | 2.7 |
| MH (N · m) | 4.1 | 2.7 |
| Vulcanizate Properties (Press Cure 177° C./10 minutes; Post Cure 200° C./16 hours) | | |
| Tensile Strength (MPa) | 10.8 | 5.2 |
| 100% Modulus (MPa) | 3.3 | 2.9 |
| Elongation at Break (%) | 395 | 250 |
| Hardness (Durometer A) | 72 | 71 |
| Compression Set (%) (150° C./70 hours, plied pellets) | 32 | Blistered Pellets |

The data show that the sequential curing process of Example 4 provides a composition with improved scorch safety, as evidenced by longer scorch times compared to those of the comparative compositions cured via the conventional one-step technique. The sequential curing process also provides improved physical properties as evidenced by the higher value of tensile strength. In addition, the Example 4 cured composition exhibits good compression set resistance while compression set test specimens could not be successfully molded from the Comparative Example D composition.

Example 5 and Comparative Examples E and F

Ninety-seven parts of Fluoroelastomer B (a $VF_2/TFE/P$ terpolymer having a monomer weight ratio of 33/52/15; a nominal Mooney viscosity $ML_{1+10}$ @ 121° C. of 60; and a density of 1.60 g/cc), 3.0 parts Maglite D magnesium oxide, 6.0 parts calcium hydroxide, and 4.5 parts of Fluoroelastomer Curative B (a 33 wt. % dispersion of tetrabutylammonium hydrogen sulfate in Fluoroelastomer B). The load factor was 70%. The polymer was mixed using the same procedure and mixing times as in Example 1. The resultant dehydrofluorinated fluoroelastomer composition was discharged and sheeted out on a two roll rubber mill. A curable composition was prepared by mixing the following ingredients on a two roll rubber mill: 110.5 parts of the dehydrofluorinated fluoroelastomer composition; 6.0 parts of Fluoroelastomer Curative B (a 33 wt. % dispersion of tetrabutylammonium hydrogen sulfate in Fluoroelastomer B); 2.0 parts bisphenol AF; and 25 parts MT (N-990) carbon black. Mixing was carried out at a temperature of approximately 90° C. The curable composition was molded into slabs and cured as described in Example 1. Compression set test specimens were prepared from plied discs having nominal dimensions of 12.7 mm diameter and 1.905 mm thickness. The discs were died from the molded slabs. Physical properties of the uncured and cured composition are shown in Table V.

For comparison, two polymer compositions were prepared using a one-step cure rather than a sequential cure. A first curable composition, Comparative Example E, was prepared by mixing the same ingredients, in the same proportions, as described above for the Example 5 composition in a single step on a rubber mill at approximately 90° C. A second curable composition, Comparative Example F, was prepared in the same manner as Comparative Example E, except that 10.5 parts of Fluoroelastomer Curative B was used in place of 6.0 parts Fluoroelastomer Curative B. There was no preliminary dehydrofluorination step in a Banbury mixer for either Comparative Example E or Comparative Example F. All curatives and other ingredients were added to the fluoroelastomers during the mixing step on the two-roll rubber mill. Molded slabs and pellet test specimens for the Comparative Example E and F compositions were prepared and cured as described for the Example 5 composition. Cure response and physical property test results are shown in Table V.

TABLE V

|  | Example 5 | Comparative Example E | Comparative Example F |
|---|---|---|---|
| Mooney Scorch @ 121° C. | | | |
| Minimum Viscosity (units) | 52 | 45 | 43 |
| Time to 2 Point Rise (minutes) | >30 | 11 | 5 |
| Time to 5 Point Rise (minutes) | >30 | 12 | 6 |
| Time to 10 Point Rise (minutes) | >30 | 14 | 8 |
| ODR | | | |

TABLE V-continued

|  | Example 5 | Comparative Example E | Comparative Example F |
|---|---|---|---|
| (177° C., 3° arc, 12 minutes) | | | |
| ML (N · m) | 1.5 | 1.6 | 1.7 |
| ts2 (minutes) | 4.7 | 2.1 | 1.1 |
| t'50 (minutes) | 9.9 | 3.8 | 2.5 |
| t'90 (minutes) | 11.6 | 8.2 | 6.2 |
| MH (N · m) | 3.3 | 7.5 | 6.7 |
| Vulcanizate Properties (Press Cure 177° C./10 minutes; Post Cure 200° C./16 hours) | | | |
| Tensile Strength (MPa) | 11.1 | 10.5 | 8.3 |
| 100% Modulus (MPa) | 4.6 | 4.1 | 4.8 |
| Elongation at Break (%) | 255 | 280 | 205 |
| Hardness (Durometer A) | 66 | 72 | 74 |
| Compression Set (%) (150° C./70 hours, plied discs) | 16 | 33 | 39 |

The data indicate that the sequential curing process provides compositions with improved scorch safety as shown by the longer scorch time of the Example 5 compositions compared to scorch times of the Comparative Examples E and F compositions. The sequential curing process of Example 5 also provides improved physical properties as evidenced by the higher tensile strength of the Example 5 compositions compared to the Comparative Example E and Comparative Example F compositions. In addition, the Example 5 compositions exhibit improved compression set resistance compared to the control compositions.

I claim:

1. A process for curing an elastomeric vinylidene fluoride copolymer which comprises the steps of
    a) mixing an elastomeric vinylidene fluoride copolymer gum with a composition comprising
        i) an organic base selected from the group consisting of quaternary ammonium salts, quaternary phosphonium salts, cyclic amines, and monofunctional amines and
        ii) an acid acceptor selected from the group consisting of metal oxides and metal hydroxides, said mixing step being conducted at a temperature of 150° C.–250° C., thereby producing an unsaturated elastomeric vinylidene fluoride copolymer;
    b) mixing said unsaturated elastomeric vinylidene fluoride copolymer, at a temperature below its curing temperature, with a composition comprising at least one compound selected from the group consisting of polyhydroxy compounds, polyamines, and organic peroxides to form a compounded unsaturated fluoroelastomer; and
    c) crosslinking said compounded unsaturated fluoroelastomer.

2. The process of claim 1 wherein the elastomeric vinylidene fluoride copolymer of step a) comprises copolymerized units of vinylidene fluoride and at least one comonomer selected from the group consisting of hexafluoropropylene, tetrafluoroethylene, propylene, and perfluoro(methyl vinyl) ether.

3. The process of claim 1 wherein the elastomeric vinylidene fluoride copolymer of step a) has a vinylidene fluoride content of 2–45 percent by weight.

4. The process of claim 2 wherein the elastomeric vinylidene fluoride copolymer is a copolymer of vinylidene fluoride, tetrafluoroethylene, and propylene.

5. The process of claim 1 wherein step (a) is performed at a temperature between about 180° C. and about 220° C.

6. The process of claim 1 wherein the metal oxide or hydroxide of step a) is selected from the group consisting of calcium hydroxide and magnesium oxide.

7. The process of claim 1 wherein a coagent is additionally present during step a).

8. The process of claim 7 wherein the coagent is selected from the group consisting of triallylisocyanurate and trimethylallylisocyanurate.

9. The process of claim 1 wherein the polyhydroxy compound is selected from the group consisting of bisphenol AF, hydroquinone, bisphenol A, and diaminobisphenol AF.

10. The process of claim 1 wherein the organic peroxide is selected from the group consisting of α, α'-bis(t-butylperoxy)diisopropylbenzene, 2,5-dimethyl-2,5-di(t-butylperoxy)hexane, and dicumyl peroxide.

11. The process of claim 1 wherein the curing agent of step (b) is a mixture of a polyhydroxy compound and a peroxide.

12. The process of claim 1 wherein the composition of step (b) with which the unsaturated elastomeric vinylidene fluoride copolymer is mixed comprises an organic peroxide and a coagent.

13. The process of claim 1 wherein the unsaturated elastomeric vinylidene fluoride copolymer is mixed with a composition comprising a polyhydroxy compound and an accelerator.

14. The process of claim 1 wherein step b) is conducted at a temperature below 120° C.

15. The process of claim 1 wherein step c) is conducted at a temperature of about 150° C.–200° C.

16. The process of claim 1 wherein step c) is conducted by exposure to radiation in the range of 2–40 megarads.

* * * * *